(12) United States Patent
Lee et al.

(10) Patent No.: US 11,743,957 B2
(45) Date of Patent: Aug. 29, 2023

(54) METHOD AND APPARATUS FOR INITIAL ACCESS IN WIRELESS COMMUNICATION SYSTEM

(71) Applicant: LG Electronics Inc., Seoul (KR)

(72) Inventors: Youngdae Lee, Seoul (KR); Sangwon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/747,969

(22) Filed: Jan. 21, 2020

(65) Prior Publication Data

US 2020/0236726 A1 Jul. 23, 2020

(30) Foreign Application Priority Data

Jan. 21, 2019 (KR) .................. 10-2019-0007438
Jan. 21, 2019 (KR) .................. 10-2019-0007452
Jan. 21, 2019 (KR) .................. 10-2019-0007476

(51) Int. Cl.
*H04W 76/15* (2018.01)
*H04W 48/08* (2009.01)
*H04W 74/08* (2009.01)
*H04W 24/08* (2009.01)

(52) U.S. Cl.
CPC .......... *H04W 76/15* (2018.02); *H04W 24/08* (2013.01); *H04W 48/08* (2013.01); *H04W 74/0833* (2013.01)

(58) Field of Classification Search
CPC . H04W 76/15; H04W 48/08; H04W 74/0833; H04W 24/08
See application file for complete search history.

(56) References Cited

U.S. PATENT DOCUMENTS

2015/0189519 A1* 7/2015 Hoglund ................. H04B 17/27
                                                        455/424
2018/0288687 A1* 10/2018 Graffagnino .......... H04W 48/16
2020/0120592 A1* 4/2020 Geng .................... H04W 76/30

* cited by examiner

*Primary Examiner* — Peter P Chau
(74) *Attorney, Agent, or Firm* — BRYAN CAVE LEIGHTON PAISNER LLP

(57) ABSTRACT

The present disclosure relates to initial access in wireless communications. According to an embodiment of the present disclosure, a method performed by a wireless device in a wireless communication system comprises: measuring a signal quality for a first cell and a signal quality for a second cell; and based on a determination that the signal quality for the first cell and the signal quality for the second cell are within an offset, performing an initial access to both of the first cell and the second cell.

10 Claims, 21 Drawing Sheets

METHOD AND APPARATUS FOR INITIAL ACCESS IN WIRELESS COMMUNICATION SYSTEM

CROSS-REFERENCE TO RELATED APPLICATIONS

Pursuant to 35 U.S.C. § 119 (e), this application claims the benefit of Korean Patent Applications No. 10-2019-0007452, filed on Jan. 21, 2019, No. 10-2019-0007438, filed on Jan. 21, 2019 and No. 10-2019-0007476, filed on Jan. 21, 2019, the contents of which are all hereby incorporated by reference herein in their entirety.

BACKGROUND OF THE DISCLOSURE

Field of the Disclosure

The present disclosure relates to initial access in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a wireless device should perform an initial access to a network to transmit/receive data. During the initial access, the wireless device should perform a random access procedure and connection procedure. For example, when the wireless device is in an idle mode, the wireless device should perform a connection establishment procedure to establish an RRC connection between the wireless device and the network.

SUMMARY OF THE DISCLOSURE

Technical Problem

An aspect of the present disclosure is to provide method and apparatus for initial access in a wireless communication system.

Another aspect of the present disclosure is to provide method and apparatus for connection establishment in a wireless communication system.

Another aspect of the present disclosure is to provide method and apparatus for connection resume in a wireless communication system.

Another aspect of the present disclosure is to provide method and apparatus for connection request to establish/resume an RRC connection in a wireless communication system.

Technical Solution

According to an embodiment of the present disclosure, a method performed by a wireless device in a wireless communication system comprises: measuring a signal quality for a first cell and a signal quality for a second cell; and based on a determination that the signal quality for the first cell and the signal quality for the second cell are within an offset, performing an initial access to both of the first cell and the second cell.

According to an embodiment of the present disclosure, a wireless device in a wireless communication system comprises: a transceiver; a memory; and at least one processor operatively coupled to the transceiver and the memory, and configured to: measure a signal quality for a first cell and a signal quality for a second cell, and based on a determination that the signal quality for the first cell and the signal quality for the second cell are within an offset, perform an initial access to both of the first cell and the second cell.

According to an embodiment of the present disclosure, a processor for a wireless device in a wireless communication system is configured to control the wireless device to perform operations comprising: measuring a signal quality for a first cell and a signal quality for a second cell; and based on a determination that the signal quality for the first cell and the signal quality for the second cell are within an offset, perfuming an initial access to both of the first cell and the second cell.

According to an embodiment of the present disclosure, a computer-readable medium having recorded thereon a program for performing each step of a method on a computer is provided. The method comprises: measuring a signal quality for a first cell and a signal quality for a second cell; and based on a determination that the signal quality for the first cell and the signal quality for the second cell are within an offset, performing an initial access to both of the first cell and the second cell.

Advantageous Effect

The present disclosure can have various advantageous effects.

For example, the UE can perform fast and reliable initial access to the network by using multiple cells of which qualities are good enough to provide a RRC connection to the UE, in particular when what triggers this initial access is critical and/or when a moving UE is located at the boundary of a cell where UE is camping.

For example, it is beneficial in that the system can provide fast and reliable initial access for a UE establishing or resuming a RRC connection.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
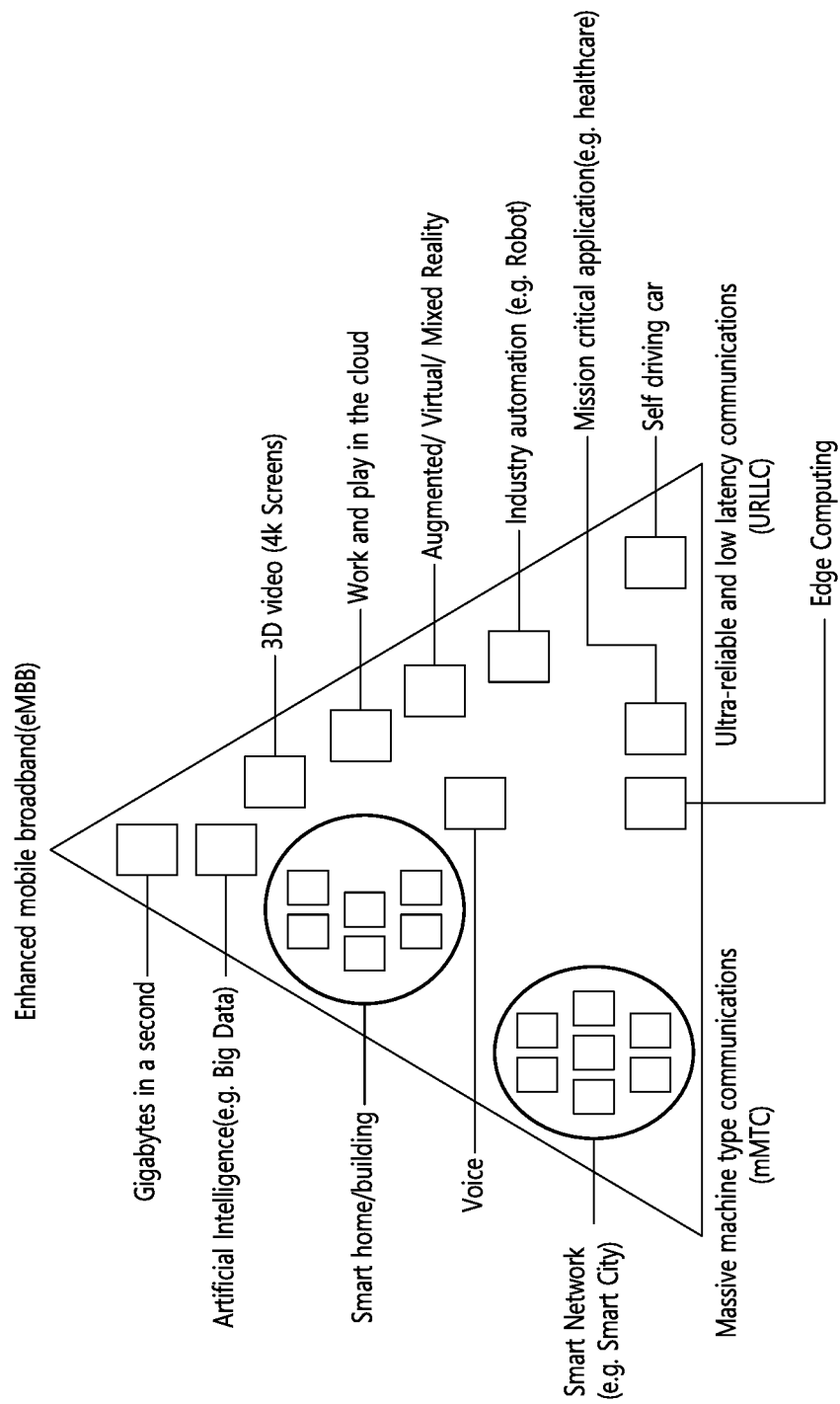
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

"Duplicated access" refers to a procedure for attempting to access to a plurality of cells by transmitting duplicated connection request messages to the plurality of cells.

"RRC_IDLE" (or, simply idle state/mode) refers to a state in which data transfer is not possible, RRC context is not established, and core network connection is not established.

"RRC_CONNECTED" (or, simply connected state/mode) refers to a state in which data transfer is possible, RRC context is established, and core network connection is established.

"RRC_INACTIVE (or, simply inactive state/mode) refers to a state in which data transfer is not possible, but RRC context is established and core network connection is established.

"Camped cell" refers to a cell which a UE camps on.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, thine terms 'random access' and 'RACH' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay. Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various SG services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
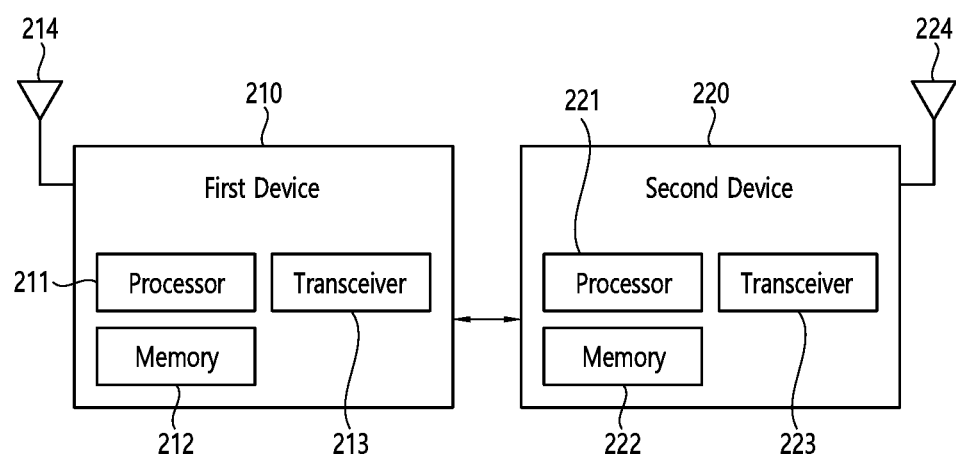
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
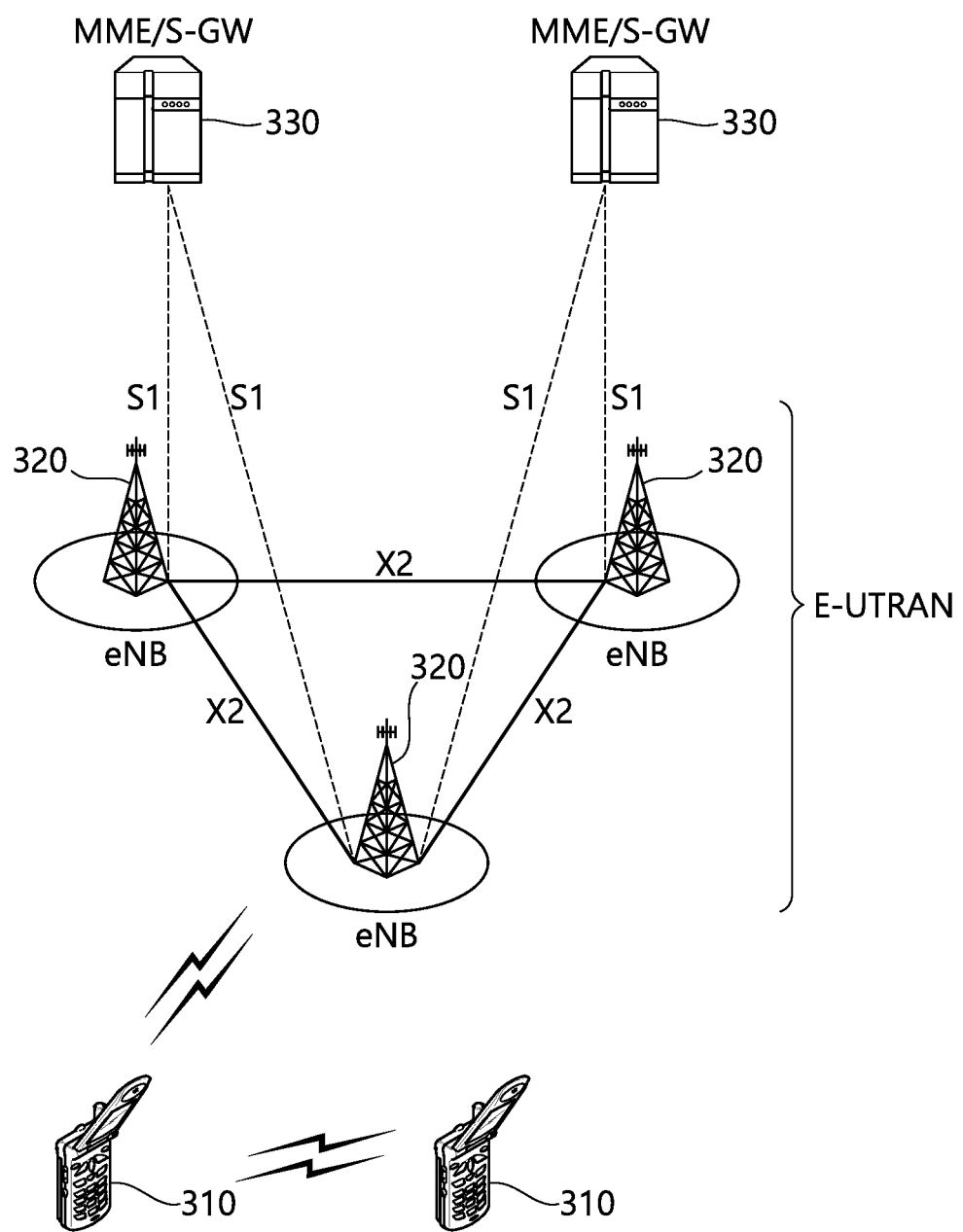
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
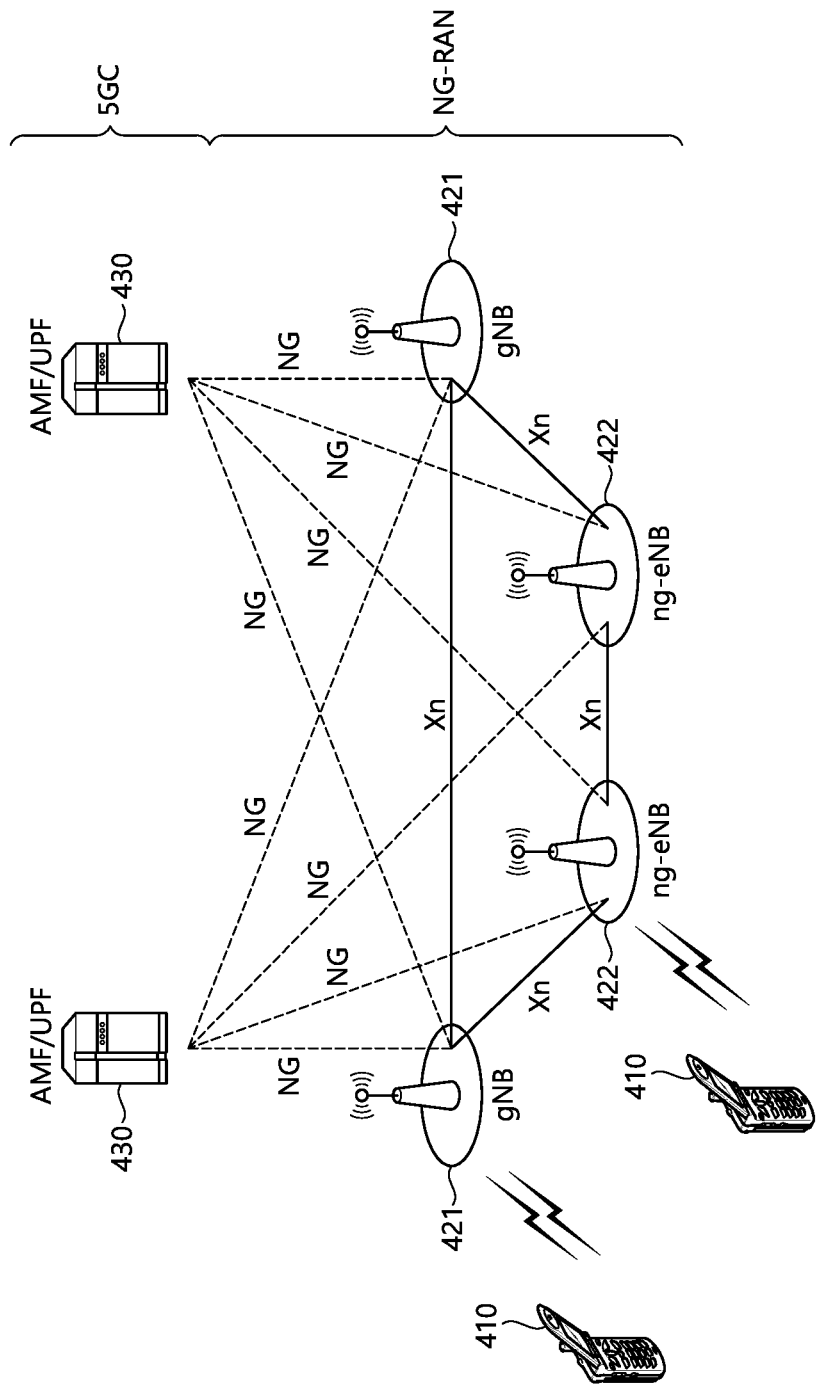
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
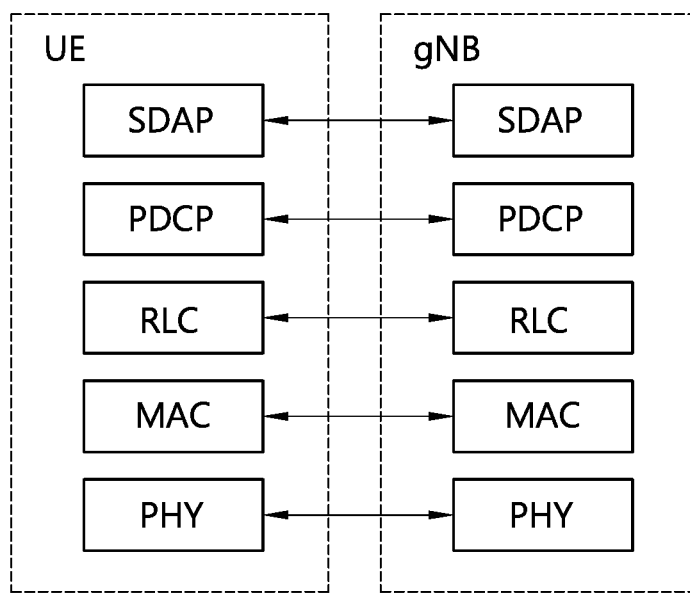
FIG. 5 shows a block diagram of a user plane protocol stack to which the technical features of the present disclosure can be applied.
Figure 6:
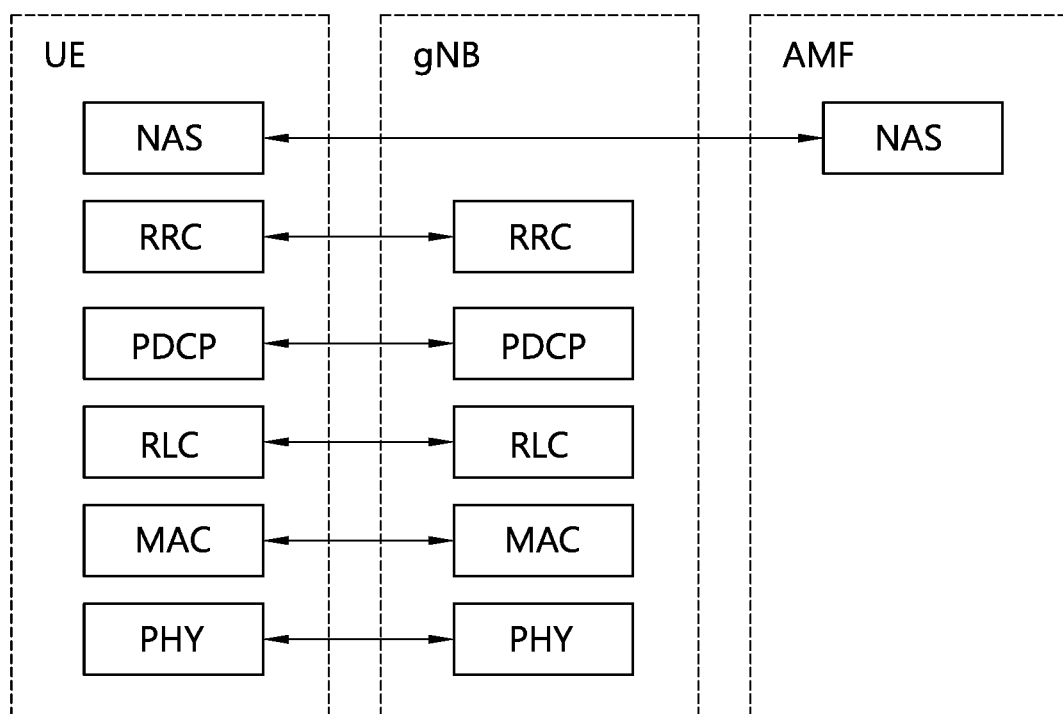
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
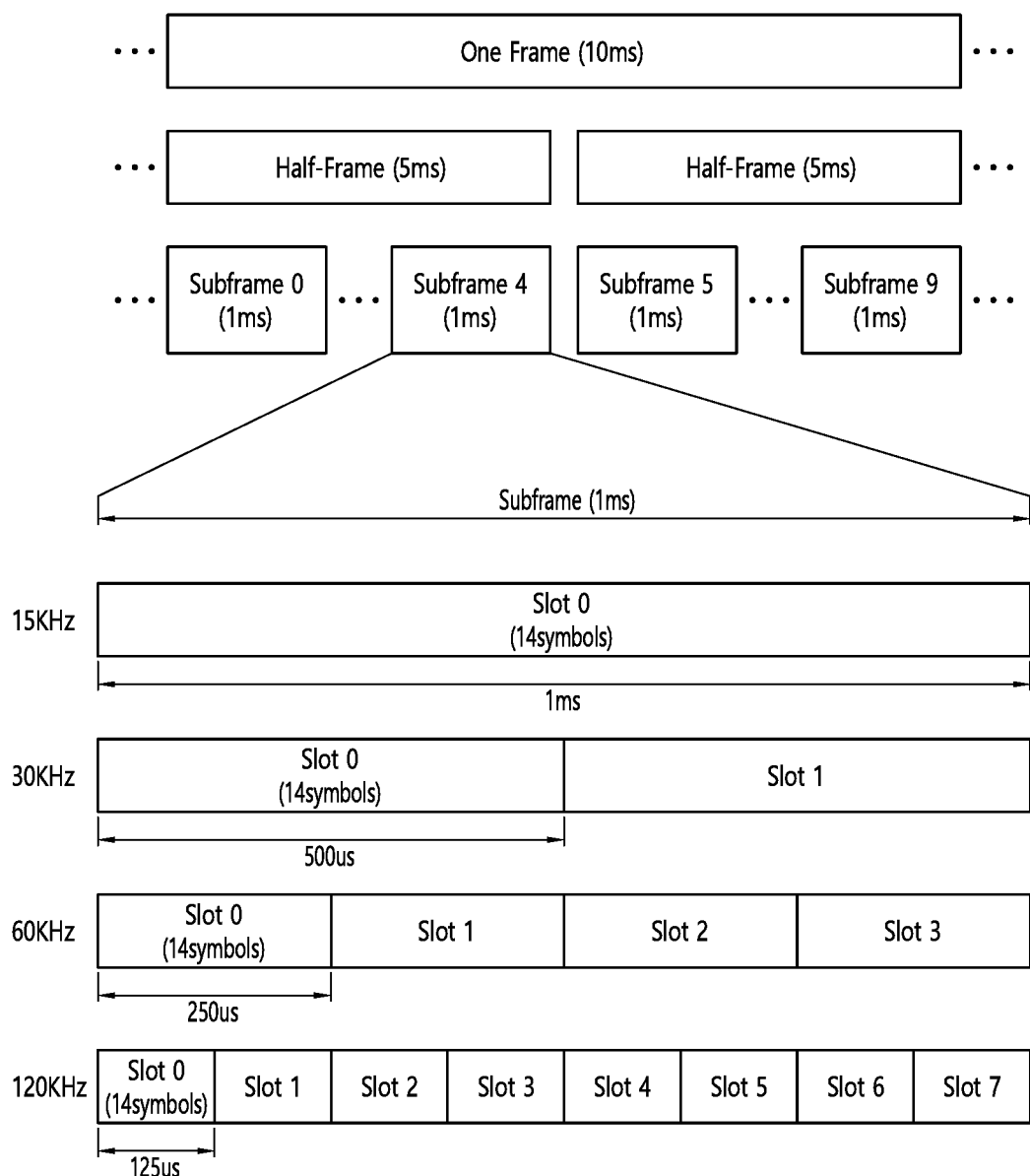
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing $\Delta f=2u*15$ kHz.

TABLE 3

| U | Nslotsymb | Nframe,uslot | Nsubframe,uslot |
|---|-----------|--------------|-----------------|
| 0 | 14        | 10           | 1               |
| 1 | 14        | 20           | 2               |
| 2 | 14        | 40           | 4               |
| 3 | 14        | 80           | 8               |
| 4 | 14        | 160          | 16              |

The following table shows the number of OFDM symbols per slot, the number of slots per frame, and the number of slots per for the extended CP, according to the subcarrier spacing $\Delta f=2u*15$ kHz.

TABLE 4

| u | Nslotsymb | Nframe,uslot | Nsubframe,uslot |
|---|-----------|--------------|-----------------|
| 2 | 12        | 40           | 4               |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i-1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
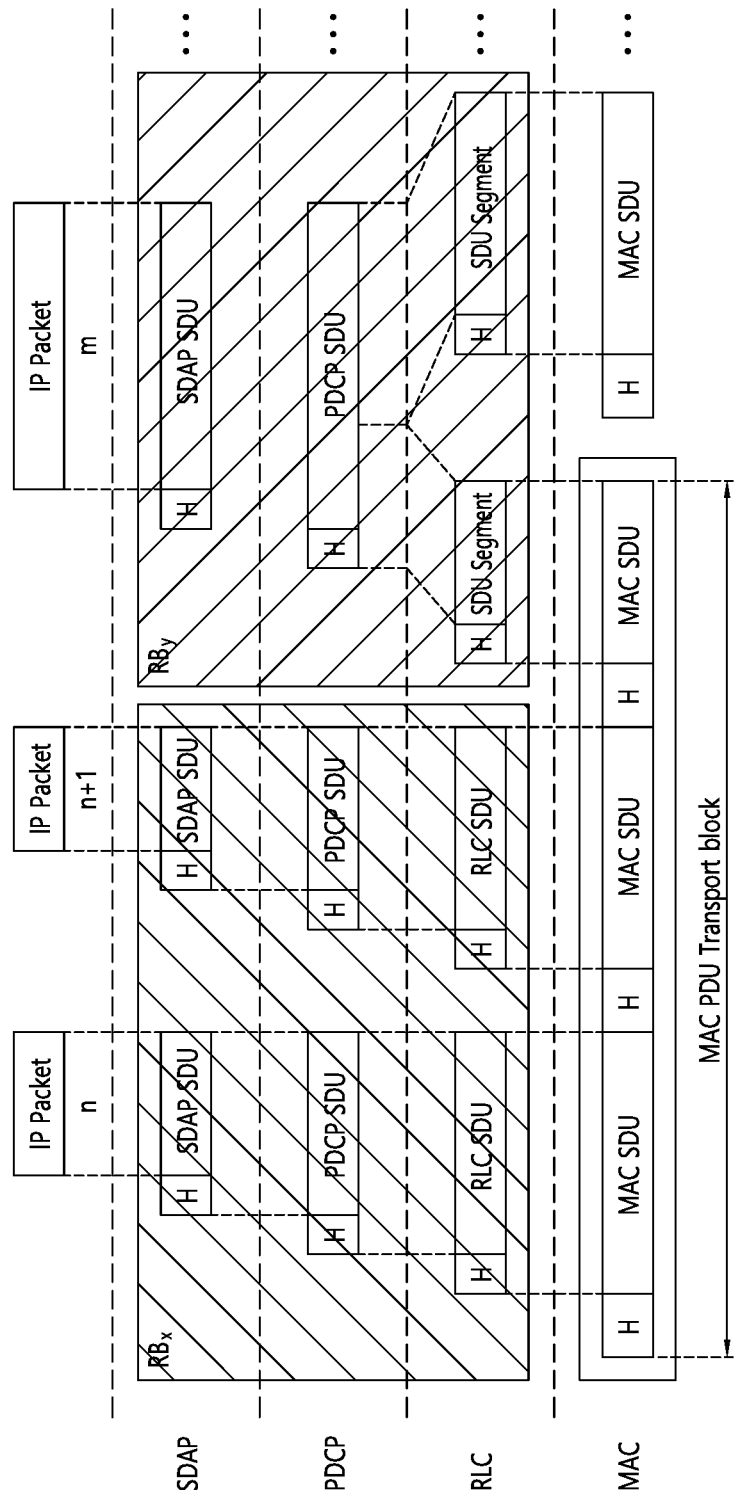
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
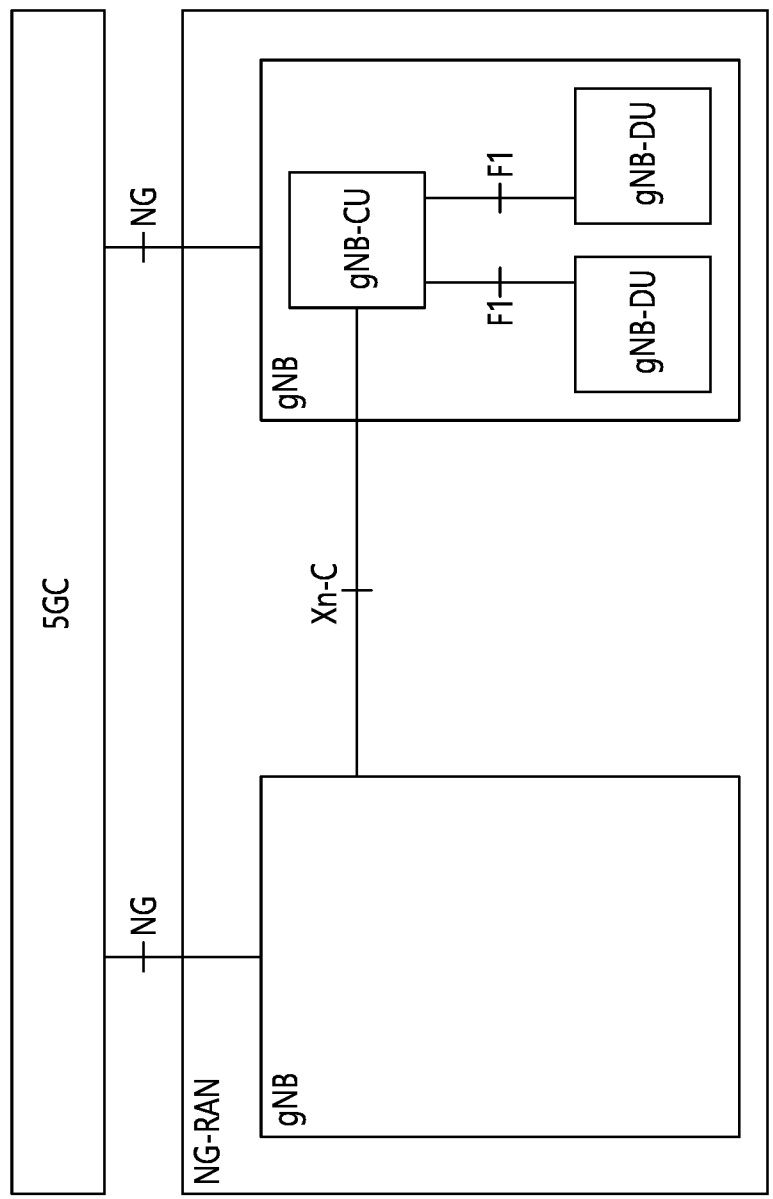
FIG. 9 shows an example of the overall architecture of an NG-RAN to which technical features of the present disclosure can be applied.

FIG. 9 shows an example of the overall architecture of an NG-RAN to which technical features of the present disclosure can be applied.

Referring to FIG. 9, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 10:
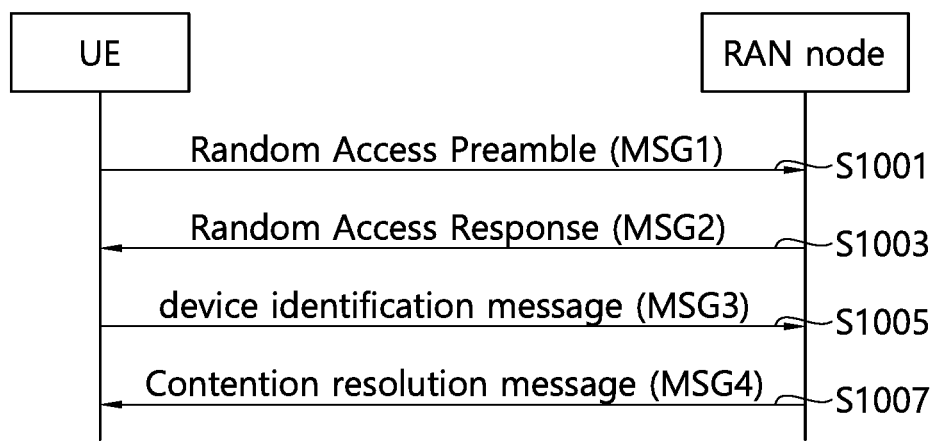
FIG. 10 shows an example of 4-step random access procedure to which technical features of the present disclosure can be applied.

FIG. 10 shows an example of 4-step random access procedure to which technical features of the present disclosure can be applied.

Referring to FIG. 10, in step S1001, The UE may transmit a random access preamble on RACH in uplink, to a RAN node. The UE may transmit a RACH message 1 (RACH MSG1, or simply MSG1) comprising the random access preamble. There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

In step S1003, The UE may receive a random access response generated by MAC on downlink-shared channel (DL-SCH), from the RAN node. The UE may receive a RACH message 2 (RACH MSG2, or simply MSG2) comprising the random access response. The random access response may be Semi-synchronous (within a flexible window of which the size is one or more transit time interval (TTI)) with the msg1. The random access response message comprises at least one of a random access preamble identifier, timing alignment information for a primary timing advance group (pTAG), initial uplink (UL) grant and assignment of temporary C-RNTI.

In step S1005, the UE may transmit a device identification message to the RAN node. The UE may transmit a RACH message 3 (RACH MSG3, or simply MSG3) comprising the device identification message. The device identification message may be a first scheduled UL transmission on UL-SCH. For initial access, the device identification message may comprise at least a NAS UE identifier. If the UE is in the RRC_CONNECTED state and has a C-RNTI, the device identification message may include the C-RNTI.

In step S1007, the UE may receive a contention resolution message from the RAN node. The UE may receive a RACH message 4 (RACH MSG4, or simply MSG4) comprising the contention resolution message. The contention resolution message may be addressed to the temporary C-RNTI on PDCCH for initial access and after radio link failure, or addressed to the C-RNTI on PDCCH for UE in RRC_CONNECTED state. The temporary C-RNTI is promoted to C-RNTI for a UE which detects RA success and does not already have a C-RNTI. A UE which detects RA success and already has a C-RNTI resumes using the C-RNTI.

Figure 11:
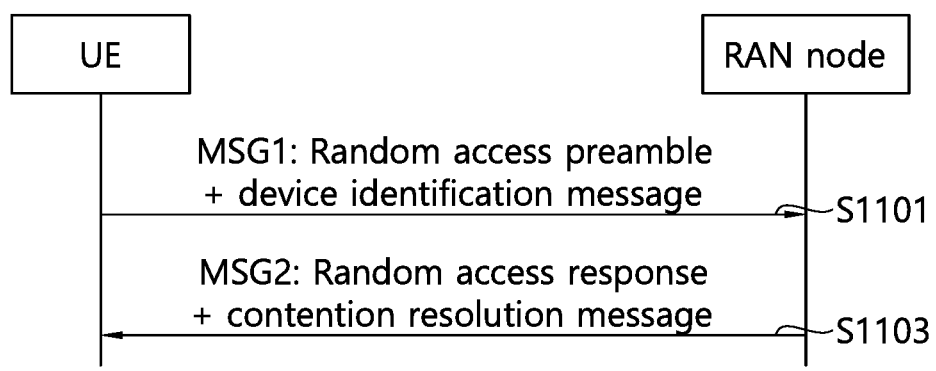
FIG. 11 shows an example of 2-step random access procedure to which technical features of the present disclosure can be applied.

FIG. 11 shows an example of 2-step random access procedure to which technical features of the present disclosure can be applied.

Referring to FIG. 11, in step S1101, a UE may transmit a random access preamble together with a device identification message to a RAN node. The UE may transmit a MSG1 comprising the random access preamble and the device identification message to the RAN node.

In step S1103, the UE may receive a random access response together with a contention resolution message from the RAN node. The UE may receive a MSG2 comprising the random access response and the contention resolution message from the RAN node.

Figure 12:
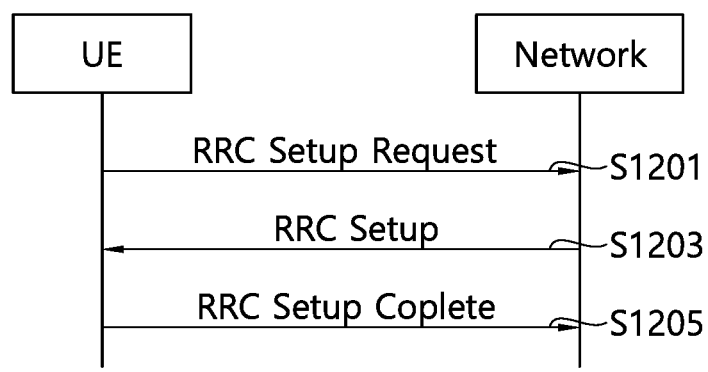
FIG. 12 shows an example of RRC connection establishment procedure in a case RRC connection establishment is successful to which technical features of the present disclosure can be applied.

FIG. 12 shows an example of RRC connection establishment procedure in a case RRC connection establishment is successful to which technical features of the present disclosure can be applied. The RRC connection establishment procedure may be performed when UE is in RRC_IDLE.

Referring to FIG. 12, in step S1201, a UE may transmit a RRCSetupRequest message to a network. The UE may transmit the RRCSetupRequest message for requesting an establishment of a RRC connection between the UE and the network.

In step S1203, the UE may receive a RRCSetup message from the network. The RRCSetup message may be received in response to the RRCSetupRequest message, if a RRC connection establishment is successful.

In step S1205, the UE may transmit a RRCSetupComplete message to the network. On receiving the RRCSetup message, the UE may enter RRC_CONNECTED, and may transmit the RRCSetupComplete message to the network as a response for the RRCSetup message.

Figure 13:
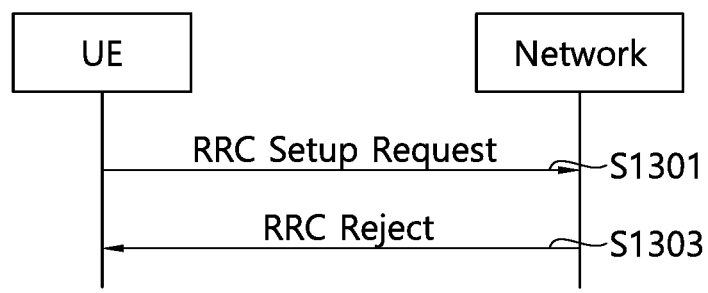
FIG. 13 shows an example of RRC connection establishment procedure in a case RRC connection establishment is failed to which technical features of the present disclosure can be applied.

FIG. 13 shows an example of RRC connection establishment procedure in a case RRC connection establishment is failed to which technical features of the present disclosure can be applied.

Referring to FIG. 13, in step S1301, a UE may transmit a RRCSetupRequest message to a network. The UE may transmit the RRCSetupRequest message for requesting an establishment of a RRC connection between the UE and the network. The RRC connection establishment procedure may be performed when UE is in RRC_IDLE.

In step S1303, the UE may receive a RRCReject message from the network. The RRCReject message may be received in response to the RRCSetupRequest message, if a RRC connection establishment is failed. On receiving the RRCReject message, the UE may inform upper layers about the failure to setup the RRC connection.

Figure 14:
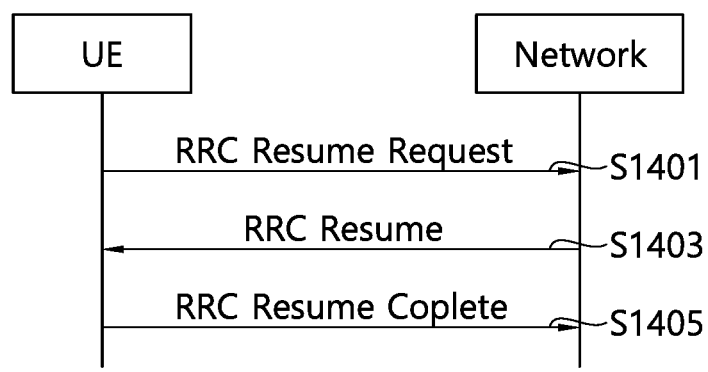
FIG. 14 shows an example of a RRC connection resume procedure in a case RRC connection resume is successful to which technical features of the present disclosure can be applied.

The purpose of the RRC connection establishment procedure as illustrated in FIGS. 13 and 14 may be to establish an RRC connection. RRC connection establishment may involve SRB1 establishment. The RRC connection establishment procedure may be also used to transfer the initial NAS dedicated information/message from the UE to the network.

The RRC connection establishment procedure may be performed when:

establishing an RRC connection; or

UE is resuming or re-establishing an RRC connection, and the network is not able to retrieve or verify the UE context. In this case, UE may receive RRCSetup and respond with RRCSetupComplete.

FIG. 14 shows an example of a RRC connection resume procedure in a case RRC connection resume is successful to which technical features of the present disclosure can be applied. The RRC connection resume procedure may be performed when UE is in RRC_INACTIVE.

Referring to FIG. 14, in step S1401, a UE may transmit a RRCResumeRequest message to a network. The UE may transmit the RRCResumeRequest message for requesting a resume of a RRC connection between the UE and the network.

In step S1403, the UE may receive a RRCResume message from the network. The RRCResume message may be received in response to the RRCResumeRequest message, if a RRC connection resume is successful.

In step S1405, the UE may transmit a RRCResumeComplete message to the network. On receiving the RRCResume message, the UE may enter RRC_CONNECTED, and may transmit the RRCResumeComplete message to the network as a response for the RRCSetup message.

Figure 15:
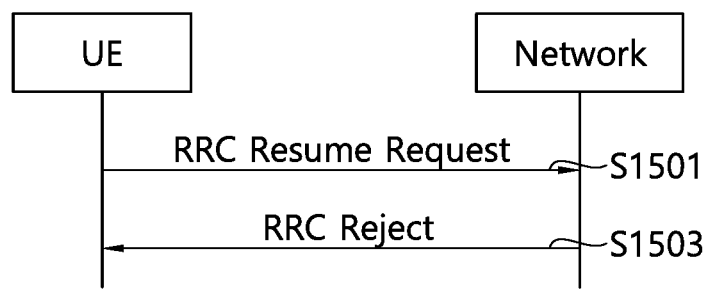
FIG. 15 shows an example of RRC connection resume procedure in a case RRC connection resume is failed to which technical features of the present disclosure can be applied.

FIG. 15 shows an example of RRC connection resume procedure in a case RRC connection resume is failed to which technical features of the present disclosure can be applied. The RRC connection resume procedure may be performed when UE is in RRC_INACTIVE.

Referring to FIG. 15, in step S1501, a UE may transmit a RRCResumeRequest message to a network. The UE may transmit the RRCResumeRequest message for requesting a resume of a RRC connection between the UE and the network.

In step S1503, the UE may receive a RRCReject message from the network. The RRCReject message may be received in response to the RRCResumeRequest message, if a RRC connection resume is failed. On receiving the RRCReject message, the UE may inform upper layers about the failure to resume the RRC connection.

The purpose of the RRC connection resume procedure as illustrated in FIGS. 14 and 15 is to resume a suspended RRC connection, including resuming SRB(s) and DRB(s) or perform an RNA update.

In some cases, UE in RRC_IDLE or RRC_INACTIVE may select a cell in which UE perform connection establishment or connection resume while performing cell reselection. If cell reselection occurs in an ongoing procedure for connection establishment or resume, UE should re-start RACH. Thus, cell reselection would increase latency of connection establishment or connection resume, even though cell reselection is necessary to find a better coverage for providing a user with a service.

To address this problem, the present disclosure provides a method for performing connection establishment or connection resume by a UE. First, access to a cell is triggered. UE may select one or more cells to send a connection request message. The qualities of the one or more cells may be above a threshold or within a range. The UE may select more than one cell. The UE may trigger RACH for the selected cells. Uplink grants may be given for the selected cells. The UE may duplicate the connection request messages and transmit the duplicated connection request messages to the selected cells. The UE may receive more than one connection response messages in response to the duplicated connection request messages. The UE may select one of the selected cells mapped to the received connection response message(s) to complete connection establishment/resume with a network.

According to various embodiments, after completing connection establishment with the network, the UE may communicate with the network. And then, the UE may perform mobility procedure. The UE may perform handover to a target gNB/cell.

Figure 16:
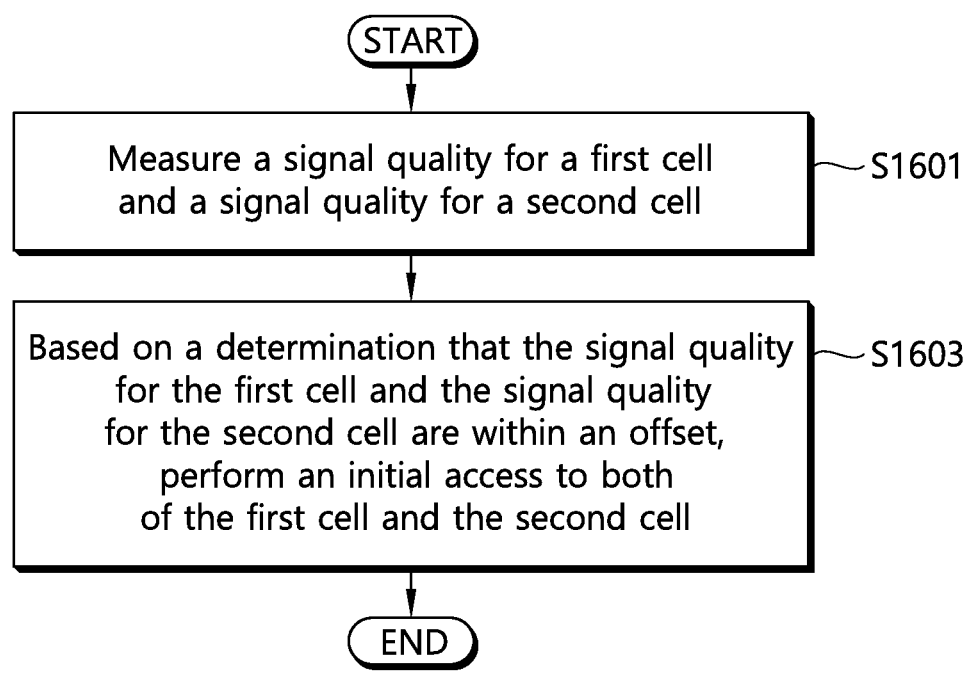
FIG. 16 shows an example of a method for performing an initial access according to an embodiment of the present disclosure.

FIG. 16 shows an example of a method for performing an initial access according to an embodiment of the present disclosure. The steps illustrated in FIG. 16 may be performed by a wireless device and/or a UE.

Referring to FIG. 16, in step S1601, the wireless device may measure a signal quality for a first cell and a signal quality for a second cell. Signal quality for a cell refers to a signal quality that is measured based on a signal received by the wireless device and transmitted from the cell. For example, the wireless device may receive a signal (e.g., reference signal) from the cell, and measure a signal quality for the cell based on the signal. Signal quality can also be referred to as a signal strength, channel quality, channel state, reference signal received power (RSRP), or reference signal received quality (RSRQ).

In step S1603, based on a determination that the signal quality for the first cell and the signal quality for the second cell are within an offset, the wireless device may perform an initial access to both of the first cell and the second cell. For example, the offset may be configured by a network via higher layer signalling. That is, the wireless device may receive, from the network, configuration information comprising the offset via higher layer signalling. For another example, the offset may be a predetermined value.

According to various embodiments, the signal quality for the first cell and the signal quality for the second sell are above a threshold. For example, the threshold may be configured by a network via higher layer signalling. That is, the wireless device may receive, form the network, configuration information comprising the threshold via higher layer signalling. For another example, the threshold may be a predetermined value.

According to various embodiments, the wireless device is in an idle mode or an inactive mode. That is, the wireless device may perform die steps S1601 and S1603 in an idle mode or an inactive mode.

According to various embodiments, the wireless device may receive, from a camped cell, information informing one or more candidate cells for a duplicated access. The information may be received via system information, or received via dedicated signalling. The first cell may be the camped cell, and the second cell may belong to the one or more candidate cells.

According to various embodiments, the signal quality for the second cell is within the offset below the signal quality for the camped cell.

According to various embodiments, the wireless device may perform the initial access to both of the first cell and the second cell as follows. The wireless device may transmit duplicated connection request messages to both of the first cell and the second cell during a random access for the first cell and a random access for the second cell. The connection request message may comprise at least one of a RRC setup request message, or RRC resume request message. The number of the duplicated connection request messages may be equal to the number of the camped cell and the one or more candidate cells. The wireless device may receive one or more connection response messages for one or more of the duplicated connection request messages. The connection response message may comprise at least one of RRC setup message, RRC resume message, or RRC reject message. On receiving the one or more connection response messages comprising the RRC setup message and/or the RRC resume message, the wireless device may enter RRC_CONNECTED. On receiving the one or more connection response messages comprising the RRC reject message, the wireless device may inform upper layer about the failure to setup the RRC connection. The wireless device may select one of the first cell and the second cell as a serving cell for the wireless device based on the one or more connection response messages. The wireless device may transmit, to the serving cell, a connection complete message. The connection complete message may comprise at least one of RRC setup complete message, or RRC resume complete message.

According to various embodiments, after transmitting the connection complete message to the serving cell, the wireless device may stop a random access for a cell that is not selected as the serving cell among the first cell and the second cell. In this case, the wireless device does not transmit a connection complete message to the cell that is not selected as the serving cell among the first cell and the second cell.

According to various embodiments, the wireless device may generate a connection request message. The wireless device may duplicate the connection request message to obtain the duplicated connection request messages.

According to various embodiments, the serving cell may comprise: a cell from which a connection response message is received first among connection response messages from the first cell and the second cell; a cell from which a connection response message is received among the first cell and the second cell; or a cell informed by the one or more connection response messages.

According to various embodiments, the wireless device may transmit random access preambles to both of the first cell and the second cell. The wireless device may receive, from both of the first cell and the second cell, random access responses each of which comprises an uplink grant. The random access preamble may be dedicated for transmitting the duplicated connection request messages. The wireless device may transmit the duplicated connection request messages to both of the first cell and the second cell based on the uplink grant.

According to various embodiments, the wireless device may transmit a RACH MSG1 comprising both of a random access preamble and a duplicated connection request message to the first cell. The wireless device may transmit a RACH MSG1 comprising both of a random access preamble and a duplicated connection request message to the second cell.

According to various embodiments, the wireless device may perform the initial access to both of the first cell and the second cell as follows. The wireless device may transmit duplicated connection request messages to both of the first cell and the second cell during the random access for the first cell and the random access for the second cell. The wireless device may receive, from the first cell, a connection reject message for a duplicated connection request message transmitted to the first cell among the duplicated connection request messages. The wireless device may stop the random access for the first cell based on the connection reject message. The random access for the second cell continues being performed while the random access for the first cell is stopped.

According to various embodiments, the wireless device may perform the initial access to both of the first cell and the second cell as follows. The wireless device may transmit duplicated connection request messages to both of the first cell and the second cell during the random access for the first cell and the random access for the second cell. The wireless device may receive, from the first cell, a connection reject message for a duplicated connection request message transmitted to the first cell among the duplicated connection request messages. The wireless device may stop both of the random access for the first cell and the random access for the second cell based on the connection rejected message received from the first cell.

Figure 17:
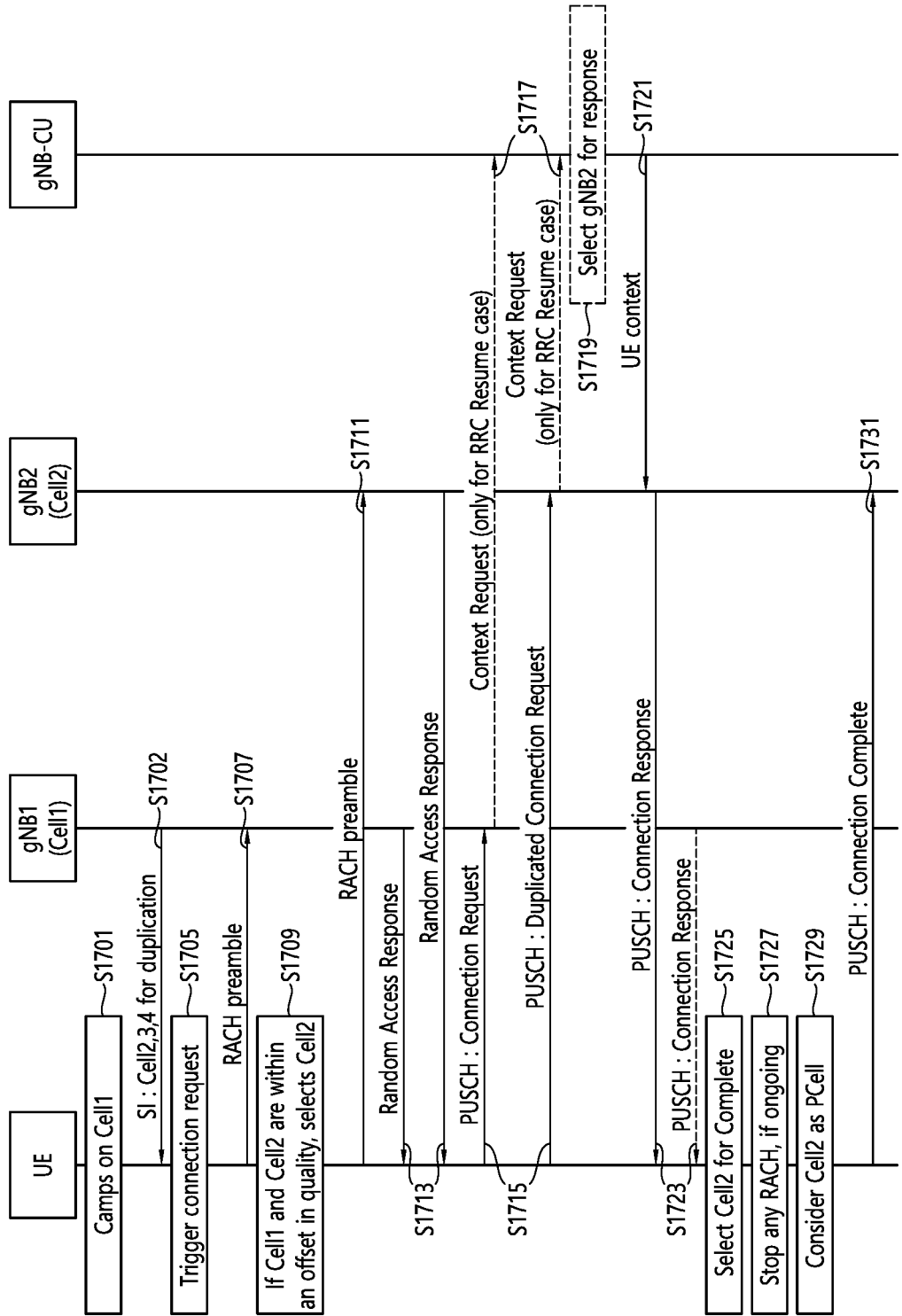
FIG. 17 shows an example of an access procedure according to an embodiment of the present disclosure.

FIG. 17 shows an example of an access procedure according to an embodiment of the present disclosure.

Referring to FIG. 17, in step S1701, the UE may perform measurements for cell reselection and camp on a cell. In this measurement, the UE may measure RSRP, RSRQ or RSSI for cell reselection. The UE may be in RRC_IDLE or RRC_INACTIVE.

In step S1703, the UE may receive system information from the camped cell (e.g., cell 1). The system information may broadcast candidate cells applicable for duplicated access together with the camped cell.

In step S1705, Access to the cell is triggered. The UE may create a connection request message. The connection request message can be a RRC Setup Request message for connection establishment or a RRC Resume Request message for connection resume.

In step S1707, the wireless device may trigger RACH on the camped cell to send the connection request message. The connection request message may be carried on CCCH (via SRB0) or DCCH (via SRB1).

According to various embodiments, the network may indicate to UE whether duplicated access is configured at a cell via system information or a dedicated signaling. One or more of what triggers this access may be configured as 'duplicated access' by the network. What triggers this access may be one of establishment/resume causes, access categories, QoS characteristics, device type and so on. For example, what triggers this access may be Mobile Originating Access, Mobile Terminating Access, Emergency Access, Tracking Area update, RNA update, a certain Access Category, MTC UE, Bandwidth limited UE, UE in Coverage Extension, IoT device, NB-IOT UE, vehicular UE, Aerial UE, delay tolerant access, low priority access, high priority access, or a certain Access Identity.

In step S1709, if the UE performs cell reselection to the other cell or if measured result on the other cell is within an offset below the quality of the camped cell or above a threshold indicated by the network, the UE may select the other cell (e.g., cell2). If the other cell corresponds to one of the candidate cells in the received system information, the UE may select the other cell (e.g., cell2) while camping on the camped cell to perform duplicated access. The UE may select more than one cell when what triggers this access is configured as duplicated access. The UE may select more than one cell when UE performs cell reselection to another cell. The UE may select more than one cell of which measured channel occupancy is below a threshold indicated by the network. The camped cell and the selected cell may be on same frequency or different frequencies or different RATs.

In another example, if the other cell does not correspond to any of the candidate cells in the received system information, the UE may reselect and camp on the other cell (i.e. the UE does not camp on the previously camped cell, for example, cell 1), so that the UE does not perform duplicated access.

According to the step S1709, at least one cell is additionally selected for duplicated access. The UE may duplicate the connection request message for the selected cell(s). The duplicated message may or may not have the same content as the original message. Duplication may be performed by RRC or PDCP or lower layers. For example, RRC or PDCP or lower layer entity may duplicate the connection request message or a SDU carrying the connection request message or a PDU carrying the connection request message. The SRB carrying the connection request message with duplication can be a split SRB or different direct SRBs. The number of duplicated messages can be two, three or more, based on the number of cells to which the UE intends to transmit the duplicated connection request messages.

In step S1711, the UE may trigger RACH for the additionally selected cell(s) to send one or more of the duplicated connection request messages. The UE may perform multiple RACH MSG1 transmissions on the cells as either a single RACH procedure for different cells or different RACH procedures for different cells. For example, the UE can transmit two preambles in parallel as RACH MSG1 to send two connection request messages in duplication. Two preambles are transmitted to different cells or in different bandwidth parts (BWPs). If 4 step RACH is used, RACH MSG1 may comprise a RACH preamble. RACH MSG1 may indicate duplication. For example, UE may transmit a preamble mapped to duplication in this RACH procedure. If 2 step RACH is configured, RACH MSG1 may include both RACH preamble and a MAC PDU carrying a connection request message. Cell reselection from the camped cell to the selected cell(s) does not stop ongoing RACH procedure.

In step S1713, the UE may receive a random access response comprising an uplink grant from the cell 1, and receive a random access response comprising an uplink grant from the cell 2.

In step S1715, the UE may transmit a connection request message to the cell 1 via PUSCH based on the uplink grant provided by the cell 1. The UE may transmit a duplicated connection request message to the cell 2 via PUSCH based on the uplink grant provided by the cell 2.

In step S1717, the cell 1 may transmit a context request message to a gNB-CU, and the cell 2 may transmit a context request message to the gNB-CU. The step S1717 may be optionally performed when the UE is in RRC_INCATIVE and the UE has transmitted a RRC resume request message.

In step S1719, the gNB CU may select a gNB for response. For example, the gNB-CU may select a gNB2 related to the cell 2 for response. The step S1719 may be optionally performed when the UE is in RRC_INCATIVE and the UE has transmitted a RRC resume request message.

In step S1721, the gNB-CU may transmit a UE context to a gNB selected in the step S1719 (e.g., gNB2). The step S1721 may be optionally performed when the UE is in RRC_INCATIVE and the UE has transmitted a RRC resume request message.

In step S1723, the UE may receive one or more connection response messages from the camped cell and/or the selected cell(s) in response to the connection request messages. Upon receiving the connection response message, the UE may enter RRC_CONNECTED. The connection response message may be either a RRC Setup message (for RRC Connection Establishment procedure from RRC_IDLE) or a RRC Resume message (for RRC Connection Resume procedure from RRC_INACTIVE).

In step S1725, the UE may select one of the camped cell (e.g., cell 2) and consider the selected cell(s) as a serving Cell. For example, the UE may select one of the camped cell and consider the selected cell(s) as a serving Cell based on measured results on the cells or when the connection response message is received (e.g., which cell the connection response message is received first) or which cell the connection response message is received from. Or, if the connection response message indicates one or more of the cells, UE may select the indicated cell(s) as serving cell(s).

In step S1727, the UE may stop RACH for the other cells (e.g., not selected cell(s)). For example, the UE may stop RACH for the other cells when the UE completes this access procedure. If RRC reject message is received as the connection response message from a cell, the UE may stop RACH transmission for the cell. The UE may still continue performing the other RACH transmission for the other cell and could be possibly successful in this Connection Establishment/Resume procedure. Alternatively, if RRC Reject message is received as the connection response message from a cell, the UE may stop all RACH transmission for all cells and unsuccessfully complete this Connection Establishment/Resume procedure.

In step S1729, the UE may consider the cell 2 as Pcell. For example, if the access procedure is used for Connection Establishment or Resume, the serving cell may be PCell. For another example, if the access procedure is used for PCell addition or change, the serving cell may be PSCell.

In step S1731, the UE may transmit a connection complete message to the serving cell and complete this access procedure. The UE may not transmit RRC connection complete message to the other cells (that is, not selected cell(s)). The connection complete message may be either a RRC Setup Complete message (for RRC Connection Establishment procedure from RRC_IDLE) or a RRC Resume Complete message (for RRC Connection Resume procedure from RRC_INACTIVE).

According to various embodiments, after transmitting the connection complete message to the serving cell, the UE may communicate with the serving cell. And then, the UE may perform mobility procedure. The UE may perform handover to a target cell.

According to various embodiments, after accessing the serving cell, the UE may communicate with gNB via the serving cell. Thereafter, the UE may perform RRC connection release procedure with gNB. The UE may receive RRC release message from gNB. Upon receiving the RRC release message, the UE may enter RRC_IDLE and/or RRC_INACTIVE. While in the RRC_IDLE and/or RRC_INACTIVE, the UE may perform cell reselection.

In the access procedure as illustrated in FIG. 17, an example of a base station behavior may be described as follows.

In step 1, the base station such as eNB or gNB may broadcast RACH configuration for a cell related to the base station. Whenever the base station receives a RACH preamble, the base station may transmit a random access response message including an uplink grant, if possible. The base station may receive a PUSCH resource based on the uplink grant to decode a connection request message, if the connection request message is carried over the PUSCH resource. The UE may use the RACH configuration to perform RACH at the cell. The RACH configuration may include RACH preambles. Some of the RACH preambles may be dedicated to duplication. The random access response message may include a temporary C-RNTI. The base station may comprise CU node and DU node.

In step 2, the base station may receive one or more connection request messages indicating same information. If the received connection request message is identical with a connection request message previously received within a certain time interval, the base station may discard the received connection request message. If the received connection request message is not identical with any other connection request message previously received within a certain time interval, the base station may select the received connection request message. The same information may include UE ID such as I-RNTI or S-TMSI and/or an Establishment/Resume Cause. The received connection request message and the previously received connection request message may be duplicated by a UE.

In step 3, if the base station accepts the connection request e.g. based on the Establishment/Resume Case, and/or if the selected connection request message indicates resumption of a previously suspended connection for a UE, the base station may request context of the UE to the other node (e.g., gNB, gNB-CU, eNB, AMF or MME), and then receive the UE context. The base station may consider that the connection request is accepted.

The other node (e.g., gNB, gNB-CU, eNB, AMF or MME) may determine whether to provide the requested UE context to the base station. If the other node receives such request from multiple base stations within a certain time, the other node may select none or only one base station, e.g. based on when the request was received, or congestion situation or measurement results received from the base station or the UE via the base station, and transfer the UE context only to the selected base station. Thus, some base station may not receive the UE context. The other node may comprise at least one of gNB, gNB-CU, eNB, AMF or MME.

If the requested UE context is not received within a certain time duration, the base station may reject the connection request according to the connection request message. The other node may be either another base station or a core network node such as gNB, gNB-CU, eNB, AMF or MME. The base station may determine whether to accept or reject the connection request e.g. based on the Establishment/Resume Case.

If the selected connection request message indicates establishment of a new connection, the base station may determine whether to accept or reject the connection request.

In step 4, the base station may construct one connection response message in response to the received connection request message(s). Then, the base station may schedule downlink transmission of the connection response message by indicating the temporary C-RNTI on PDCCH and transmit the connection response message over PDSCH based on the scheduling. If the connection request was accepted, the connection response message may be a RRC Setup message (for RRC Connection Establishment procedure from RRC_IDLE) or a RRC Resume message (for RRC Connection Resume procedure from RRC_INACTIVE). If the connection request was rejected, the connection response message may be RRC Reject message.

In step 5, if the connection request was accepted, and if the base station receives acknowledgement to the downlink PDSCH transmission and a connection complete message from the UE, the base station may consider that the UE entered RRC_CONNECTED.

Optionally, in step 6, the base station may communicate with the UE. Thereafter, the base station may transmit RRC release message to the UE. Upon receiving the RRC release message, the UE may enter RRC_IDLE and/or RRC_INACTIVE. While in the RRC_IDLE and/or RRC_INACTIVE, the UE may perform cell reselection.

According to various embodiments, the UE can perform fast and reliable initial access to the network by using multiple cells of which qualities are good enough to provide a RRC connection to the UE, in particular when what triggers this initial access is critical and/or when a moving UE is located at the boundary of a cell where UE is camping.

According to various embodiments, it is beneficial in that the system can provide fast and reliable initial access for a UE establishing or resuming a RRC connection.

Figure 18:
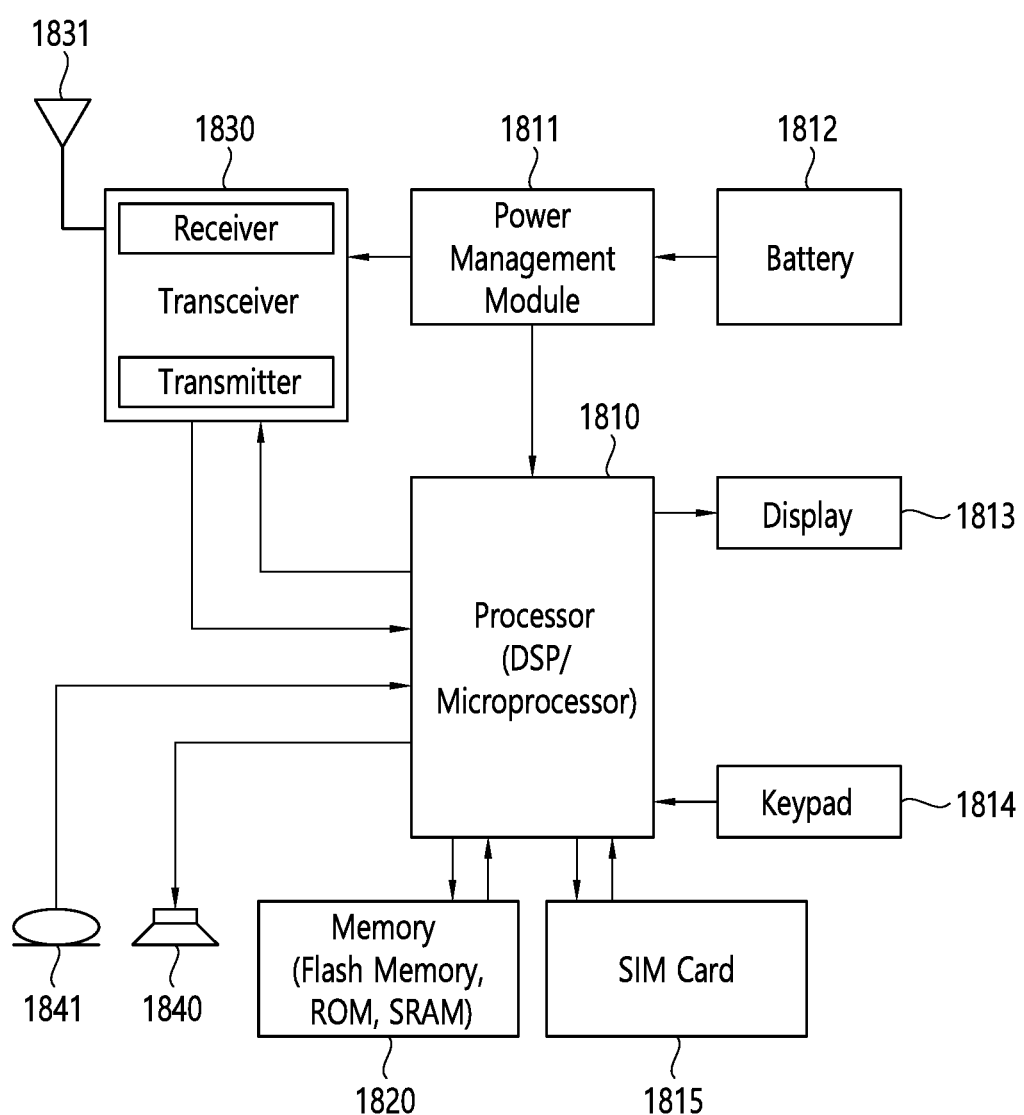
FIG. 18 shows a UE to implement an embodiment of the present disclosure. The present disclosure described above for UE side may be applied to this embodiment.

FIG. 18 shows a UE to implement an embodiment of the present disclosure. The present disclosure described above for UE side may be applied to this embodiment.

A UE includes a processor 1810, a power management module 1811, a battery 1812, a display 1813, a keypad 1814, a subscriber identification module (SIM) card 1815, a memory 1820, a transceiver 1830, one or more antennas 1831, a speaker 1840, and a microphone 1841.

The processor 1810 may be configured to implement proposed functions, procedures and/or methods described in this description. Layers of the radio interface protocol may be implemented in the processor 1810. The processor 1810 may include application-specific integrated circuit (ASIC), other chipset, logic circuit and/or data processing device.

The processor 1810 may be an application processor (AP). The processor 1810 may include at least one of a digital signal processor (DSP), a central processing unit (CPU), a graphics processing unit (GPU), a modem (modulator and demodulator). An example of the processor 1810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1810 may be configured to, or configured to control the transceiver 1830 to implement steps performed by the UE and/or the wireless device throughout the disclosure.

The power management module 1811 manages power for the processor 1810 and/or the transceiver 1830. The battery 1812 supplies power to the power management module 1811. The display 1813 outputs results processed by the processor 1810. The keypad 1814 receives inputs to be used by the processor 1810. The keypad 1814 may be shown on the display 1813. The SIM card 1815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1820 is operatively coupled with the processor 1810 and stores a variety of information to operate the processor 1810. The memory 1820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1820 and executed by the processor 1810. The memory 1820 can be implemented within the processor 1810 or external to the processor 1810 in which case those can be communicatively coupled to the processor 1810 via various means as is known in the art.

The transceiver 1830 is operatively coupled with the processor 1810, and transmits and/or receives a radio signal. The transceiver 1830 includes a transmitter and a receiver. The transceiver 1830 may include baseband circuitry to process radio frequency signals. The transceiver 1830 controls the one or more antennas 1831 to transmit and/or receive a radio signal.

The speaker 1840 outputs sound-related results processed by the processor 1810. The microphone 1841 receives sound-related inputs to be used by the processor 1810.

Figure 19:
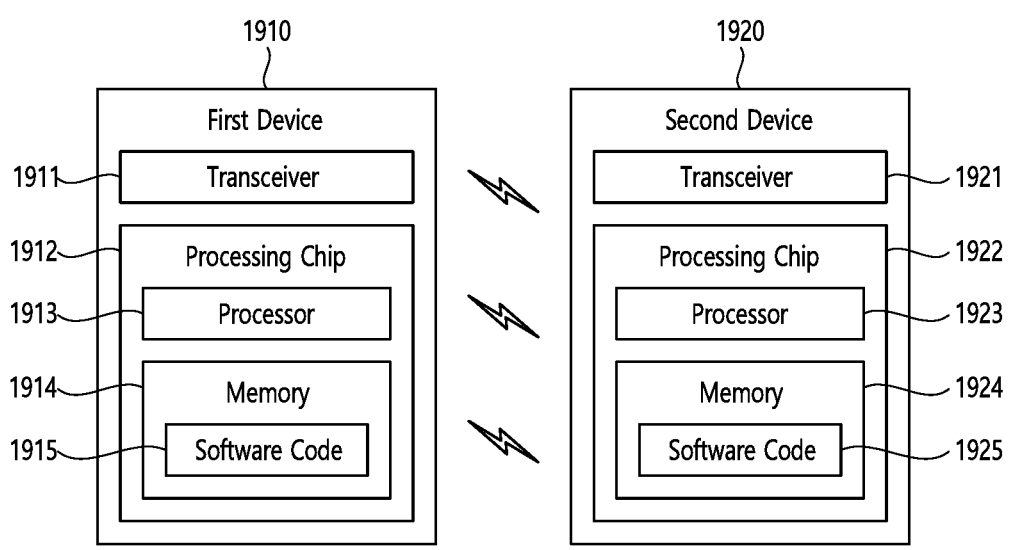
FIG. 19 shows another example of a wireless communication system to which the technical features of the present disclosure can be applied.

FIG. 19 shows another example of a wireless communication system to which the technical features of the present disclosure can be applied.

Referring to FIG. 19, the wireless communication system may include a first device 1910 (i.e., first device 210) and a second device 1920 (i.e., second device 220).

The first device 1910 may include at least one transceiver, such as a transceiver 1911, and at least one processing chip, such as a processing chip 1912. The processing chip 1912 may include at least one processor, such a processor 1913, and at least one memory, such as a memory 1914. The memory may be operably connectable to the processor 1913. The memory 1914 may store various types of information and/or instructions. The memory 1914 may store a software code 1915 which implements instructions that, when executed by the processor 1913, perform operations of the first device 910 described throughout the disclosure. For example, the software code 1915 may implement instructions that, when executed by the processor 1913, perform the functions, procedures, and/or methods of the first device 1910 described throughout the disclosure. For example, the software code 1915 may control the processor 1913 to perform one or more protocols. For example, the software code 1915 may control the processor 1913 to perform one or more layers of the radio interface protocol.

The second device 1920 may include at least one transceiver, such as a transceiver 1921, and at least one processing chip, such as a processing chip 1922. The processing chip 1922 may include at least one processor, such a processor 1923, and at least one memory, such as a memory 1924. The memory may be operably connectable to the processor 1923. The memory 1924 may store various types of information and/or instructions. The memory 1924 may store a software code 1925 which implements instructions that, when executed by the processor 1923, perform operations of the second device 1920 described throughout the disclosure. For example, the software code 1925 may implement instructions that, when executed by the processor 1923, perform the functions, procedures, and/or methods of the second device 1920 described throughout the disclosure. For example, the software code 1925 may control the processor 1923 to perform one or more protocols. For example, the software code 1925 may control the processor 1923 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 20:
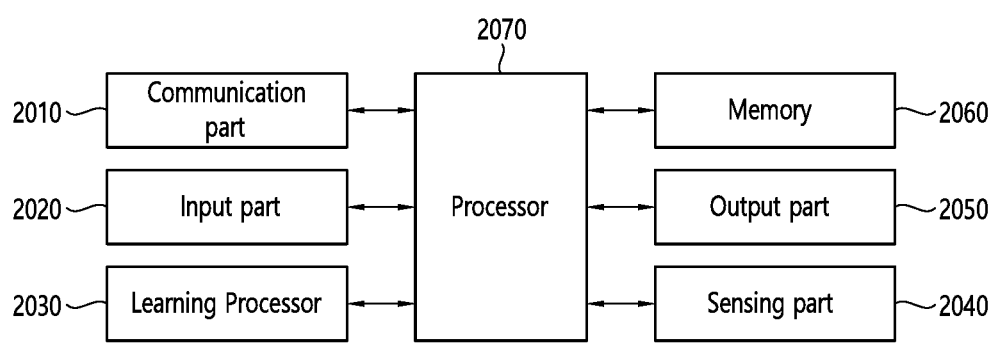
FIG. 20 shows an example of an AI device to which the technical features of the present disclosure can be applied.

FIG. 20 shows an example of an AI device to which the technical features of the present disclosure can be applied.

The AI device 2000 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 20, the AI device 2000 may include a communication part 2010, an input part 2020, a learning processor 2030, a sensing part 2040, an output part 2050, a memory 2060, and a processor 2070.

The communication part 2010 can transmit and/or receive data to and/or from external devices such as the AI devices and the AI server using wire and/or wireless communication technology. For example, the communication part 2010 can transmit and/or receive sensor information, a user input, a learning model, and a control signal with external devices. The communication technology used by the communication part 2010 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2020 can acquire various kinds of data. The input part 2020 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2020 can acquire input data to be used when acquiring an output using learning data and a learning model for model learning. The input part 2020 may obtain raw input data, in which case the processor 2070 or the learning processor 2030 may extract input features by preprocessing the input data.

The learning processor 2030 may learn a model composed of an ANN using learning data. The learned ANN can be referred to as a learning model. The learning model can be used to infer result values for new input data rather than learning data, and the inferred values can be used as a basis for determining which actions to perform. The learning processor 2030 may perform AI processing together with the learning processor of the AI server. The learning processor 2030 may include a memory integrated and/or implemented in the AI device 2000. Alternatively, the learning processor 2030 may be implemented using the memory 2060, an external memory directly coupled to the AI device 2000, and/or a memory maintained in an external device.

The sensing part 2040 may acquire at least one of internal information of the AI device 2000, environment information of the AI device 2000, and/or the user information using various sensors. The sensors included in the sensing part 2040 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2050 may generate an output related to visual, auditory, tactile, etc. The output part 2050 may include a display unit for outputting visual information, a speaker for outputting auditory information, and/or a haptic module for outputting tactile information.

The memory 2060 may store data that supports various functions of the AI device 2000. For example, the memory 2060 may store input data acquired by the input part 2020, learning data, a learning model, a learning history, etc.

The processor 2070 may determine at least one executable operation of the AI device 2000 based on information determined and/or generated using a data analysis algorithm and/or a machine learning algorithm. The processor 2070 may then control the components of the AI device 2000 to perform the determined operation. The processor 2070 may request, retrieve, receive, and/or utilize data in the learning processor 2030 and/or the memory 2060, and may control the components of the AI device 2000 to execute the predicted operation and/or the operation determined to be desirable among the at least one executable operation. The processor 2070 may generate a control signal for controlling the external device, and may transmit the generated control signal to the external device, when the external device needs to be linked to perform the determined operation. The processor 2070 may obtain the intention information for the user input and determine the user's requirements based on the obtained intention information. The processor 2070 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2030 and/or learned by the learning processor of the AI server, and/or learned by their distributed processing. The processor 2070 may collect history information including the operation contents of the AI device 2000 and/or the user's feedback on the operation, etc. The processor 2070 may store the collected history information in the memory 2060 and/or the learning processor 2030, and/or transmit to an external device such as the AI server. The collected history information can be used to update the learning model. The processor 2070 may control at least some of the components of AI device 2000 to drive an application program stored in memory 2060. Furthermore, the processor 2070 may operate two or more of the components included in the AI device 2000 in combination with each other for driving the application program.

Figure 21:
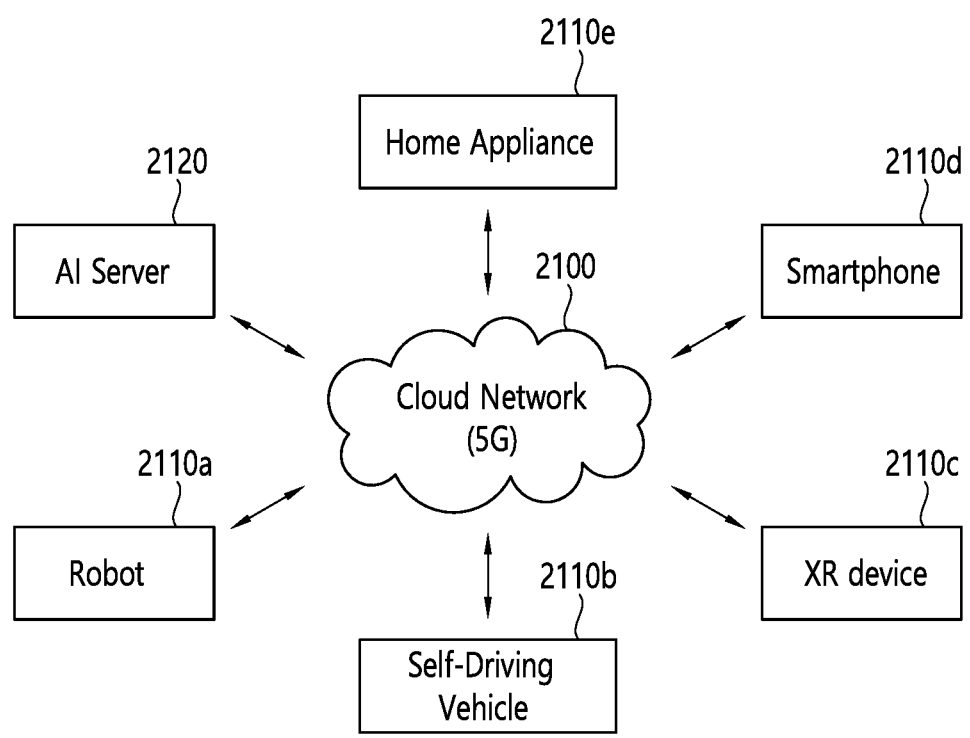
FIG. 21 shows an example of an AI system to which the technical features of the present disclosure can be applied.

FIG. 21 shows an example of an AI system to which the technical features of the present disclosure can be applied.

Referring to FIG. 21, in the AI system, at least one of an AI server 2120, a robot 2110a, an autonomous vehicle 2110b, an XR device 2110c, a smartphone 2110d and/or a home appliance 2110e is connected to a cloud network 2100. The robot 2110a, the autonomous vehicle 2110b, the XR device 2110c, the smartphone 2110d, and/or the home appliance 2110e to which the AI technology is applied may be referred to as AI devices 2110a to 2110e.

The cloud network 2100 may refer to a network that forms part of a cloud computing infrastructure and/or resides in a cloud computing infrastructure. The cloud network 2100 may be configured using a 3G network, a 4G or LTE network, and/or a 5G network. That is, each of the devices 2110a to 2110e and 2120 consisting the AI system may be connected to each other through the cloud network 2100. In particular, each of the devices 2110a to 2110e and 2120 may communicate with each other through a base station, but may directly communicate with each other without using a base station.

The AI server 2120 may include a server for performing AI processing and a server for performing operations on big data. The AI server 2120 is connected to at least one or more of AI devices constituting the AI system, i.e. the robot 2110a, the autonomous vehicle 2110b, the XR device 2110c, the smartphone 2110d and/or the home appliance 2110e through the cloud network 2100, and may assist at least some AI processing of the connected AI devices 2110a to 2110e. The AI server 2120 can learn the ANN according to the machine learning algorithm on behalf of the AI devices 2110a to 2110e, and can directly store the learning models and/or transmit them to the AI devices 2110a to 2110e. The AI server 2120 may receive the input data from the AI devices 2110a to 2110e, infer the result value with respect to the received input data using the learning model, generate a response and/or a control command based on the inferred result value, and transmit the generated data to the AI devices 2110a to 2110e. Alternatively, the AI devices 2110a to 2110e may directly infer a result value for the input data using a learning model, and generate a response and/or a control command based on the inferred result value.

Various embodiments of the AI devices 2110a to 2110e to which the technical features of the present disclosure can be applied will be described. The AI devices 2110a to 2110e shown in FIG. 21 can be seen as specific embodiments of the AI device 2000 shown in FIG. 20.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
- camping on a first cell;
- receiving, from the first cell the wireless device camps on, system information, wherein the system information comprises information informing one or more candidate cells for a duplicated access including a second cell;
- measuring a signal quality of the first cell and a signal quality of the second cell; and
- based on a determination that the signal quality of the first cell and the signal quality of the second cell are within an offset, performing an initial access to both of the first cell and the second cell, wherein the performing of the initial access to both of the first cell and the second cell comprises:
- transmitting a first random access preamble to the first cell and a second random access preamble to the second cell;
- receiving a first random access response comprising a first uplink grant from the first cell, and a second random access response comprising a second uplink grant from the second cell, after transmitting the first random access preamble, and the second random access preamble;
- transmitting a first connection request message based on the first uplink grant via a physical uplink shared channel (PUSCH) to the first cell, and a second connection request message based on the second uplink grant via a PUSCH to the second cell, wherein the second connection request message is a duplicate connection request message of the first connection request message; and
- after transmitting the first connection request message and the second connection request message, receiving, at least one of a first connection response message via a physical downlink shared channel (PDSCH) from the first cell, or a second connection response message via a PDSCH from the second cell.

2. The method of claim 1, wherein the signal quality of the first cell and the signal quality of the second cell are above a threshold that is configured by a network or is a predetermined value.

3. The method of claim 1, wherein the wireless device is in an idle mode or an inactive mode.

4. The method of claim 1, wherein the offset is configured by a network, or is a predetermined value.

5. The method of claim 1, wherein the signal quality of the second cell is within the offset below the signal quality of the camped cell.

6. The method of claim 1, wherein the performing of the initial access to both of the first cell and the second cell comprises:
- receiving, from the first cell, a connection reject message for the first connection request message transmitted to the first cell; and
- stopping a random access for the first cell based on the connection reject message, wherein a random access for the second cell continues being performed while the random access for the first cell is stopped.

7. The method of claim 1, wherein the performing of the initial access to both of the first cell and the second cell comprises:
- receiving, from the first cell, a connection reject message for the first connection request message transmitted to the first cell; and
- stopping both of a random access for the first cell and a random access for the second cell based on the connection reject message received from the first cell.

8. The method of claim 1, wherein the wireless device is in communication with at least one of a user equipment, a network, or autonomous vehicles other than the wireless device.

9. A wireless device in a wireless communication system comprising:
- a transceiver;
- a memory; and
- at least one processor operatively coupled to the transceiver and the memory, and configured to:
- camp on a first cell,
- control the transceiver to receive, from the first cell the wireless device camps on, system information, wherein the system information comprises information informing one or more candidate cells for a duplicated access including a second cell,
- measure a signal quality of the first cell and a signal quality of the second cell, and
- based on a determination that the signal quality of the first cell and the signal quality of the second cell are within an offset, perform an initial access to both of the first cell and the second cell, wherein the performing of the initial access to both of the first cell and the second cell comprises:
- transmitting a first random access preamble to the first cell and a second random access preamble to the second cell;
- receiving a first random access response comprising a first uplink grant from the first cell, and a second random access response comprising a second uplink grant from the second cell, after transmitting the first random access preamble, and the second random access preamble;
- transmitting a first connection request message based on the first uplink grant via a physical uplink shared channel (PUSCH) to the first cell, and a second connection request message based on the second uplink grant via a PUSCH to the second cell, wherein the second connection request message is a duplicate connection request message of the first connection request message; and
- after transmitting the first connection request message and the second connection request message, receiving, at least one of a first connection response message via a physical downlink shared channel (PDSCH) from the first cell, or a second connection response message via a PDSCH from the second cell.

10. A processor for a wireless device in a wireless communication system, wherein the processor is configured to control the wireless device to perform operations comprising:
- camping on a first cell;
- receiving, from the first cell the wireless device camps on, system information wherein the system information comprises information informing one or more candidate cells for a duplicated access including a second cell;
- measuring a signal quality of the first cell and a signal quality of the second cell; and
- based on a determination that the signal quality of the first cell and the signal quality of the second cell are within an offset, performing an initial access to both of the first cell and the second cell, wherein the performing of the initial access to both of the first cell and the second cell comprises:

transmitting a first random access preamble to the first cell and a second random access preamble to the second cell;

receiving a first random access response comprising a first uplink grant from the first cell, and a second random access response comprising a second uplink grant from the second cell, after transmitting the first random access preamble and the second random access preamble;

transmitting a first connection request message based on the first uplink grant via a physical uplink shared channel (PUSCH) to the first cell, and a second connection request message based on the second uplink grant via a PUSCH to the second cell, wherein the second connection request message is a duplicate connection request message the first connection request message; and after transmitting the first connection request message and the second connection request message, receiving at least one of a first connection response message via a physical downlink shared channel (PDSCH) from the first cell, or a second connection response message via a PDSCH from the second cell.

* * * * *